(12) United States Patent
DeJesus et al.

(10) Patent No.: US 6,430,271 B1
(45) Date of Patent: Aug. 6, 2002

(54) MESSAGE DELIVERY SYSTEM

(75) Inventors: Jose Antonio DeJesus, Norwalk, CT (US); Gerard T. Hagan, Jr., Brewster, NY (US); Elizabeth Anne Hoskin, Stamford, CT (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/026,863

(22) Filed: Feb. 20, 1998

(51) Int. Cl.[7] .................................................. H04M 3/42
(52) U.S. Cl. ................................. 379/88.22; 379/265.13
(58) Field of Search ..................................... 379/127, 142, 379/265, 266, 309, 88.19, 88.2, 88.21, 88.22, 88.29, 265.13, 265.01, 265.02, 265.12, 265.07, 127.01, 127.06, 142.01, 142.06, 142.07

(56) References Cited

U.S. PATENT DOCUMENTS

| 4,916,726 A | * | 4/1990 | Morley, Jr. et al. ............ 379/88 |
| 5,001,710 A | * | 3/1991 | Gawrys et al. ............ 370/110.1 |
| 5,008,930 A | * | 4/1991 | Gawrys et al. ............. 379/210 |
| 5,206,903 A | * | 4/1993 | Kohler et al. ................ 379/309 |
| 5,729,593 A | * | 3/1998 | Baker et al. ................... 379/67 |
| 5,793,861 A | * | 8/1998 | Haigh ......................... 379/266 |

* cited by examiner

Primary Examiner—Scott L. Weaver
(74) Attorney, Agent, or Firm—Blakely, Sokoloff, Taylor & Zafman LLP

(57) ABSTRACT

A method and apparatus is disclosed that generates a message in response to an inquiry. The present invention generates such a message by applying the inquiry to a data table contained within a receiving device, wherein a call identifier is associated with the inquiry. An agent is then selected from an agent group corresponding to the call identifier. The call identifier is then supplied to an interface message device, wherein an agent message associated with the selected agent is chosen from an agent message database based upon the call identifier. The agent message is then supplied to the source of the inquiry.

26 Claims, 4 Drawing Sheets

MESSAGE DELIVERY SYSTEM

FIELD OF THE INVENTION

The present invention relates to message delivery systems. More specifically, the present invention relates to a message delivery systems wherein a specific reply message is generated based upon a specific type of inquiry utilizing a centralized message database.

BACKGROUND

Due to the increase in customer service based industries there is a need for effective messaging and routing systems which supply a greeting or message in response to an inquiry (such as a telephone call), while routing the inquiry to a qualified agent. Several different systems have been utilized in an attempt to provide effective messaging and routing systems, for instance, some systems utilize a collection of physical operators which receive incoming calls and route them to the desired agents. While another system allows a caller to select the desired agent through a touch tone selection method, wherein the caller dials the extension of the desired service agent and is connected to a singular greeting associated with the extension of the chosen service agent. Yet another system provides a caller with a single number associated with a particular area of service, wherein the caller is greeted by a standard greeting message and then placed in a queue to await the next available service agent to answer their inquiry.

Each of the aforementioned message or greeting systems essentially utilize the same principle, in that a generic recording is provided to the caller without regard to the caller's inquiry type. For instance, if a caller has a software inquiry, the caller is typically given a generic message in response to a standard software inquiry. Moreover, the message or greeting is typically not in the voice of the agent who will eventually service the caller, thereby making the message or greeting impersonal to the caller. Further, the message may not be directed toward the type of problem that the caller is experiencing. For instance, in the above example, the same caller that has a software inquiry may be calling about a warranty question related to the software and not necessarily about a technical question related to the software, but may nevertheless be connected with an agent who is qualified to only answer the technical questions only and not warranty questions.

Moreover, if the recorded greeting or message is associated with a particular agent, the greeting or message is typically maintained on the agent's own greeting device, such as a personal computer or other device. Such devices do not typically offer a selection of messages which can be played to a caller based on the caller's inquiry type. Moreover, the messages recorded by the agent are typically not under supervision or central control, whereby the agent may record messages which might be considered to be improper in view of a desired corporate profile.

It is therefore desirable to provide a centralized message delivery system which allows the caller to be associated with a particular call or inquiry type, wherein a particular agent is chosen having the necessary qualifications to address the particular call type or inquiry. Additionally, it is desirable to have a message or greeting, which is played to the caller during connection to the agent, which also corresponds to the particular call or inquiry type. Further, in order to personalize the call, the message or greeting played to the caller should be in the voice of the particular agent who was chosen as having the necessary qualifications to address the particular call type or inquiry.

SUMMARY OF THE INVENTION

The present invention is directed to a method and apparatus for generating a message in response to an inquiry. Embodiments of the present invention generate such a message by applying the inquiry to a data table contained within a receiving device, wherein a call identifier is associated with the inquiry. An agent is then selected from an agent group corresponding to the call identifier. The call identifier is then supplied to an interface message device, wherein an agent message associated with the selected agent is chosen from an agent message database based upon the call identifier. Accordingly, the agent message is then supplied to the source of the inquiry.

In an embodiment of the invention, the call identifier is associated with the inquiry based upon a determined inquiry type.

In another embodiment of the invention, the agent is selected based upon a correlation between the call identifier and at least one attribute associated with the agent.

In particular embodiments of the present invention, the interface message device is external to the receiving device.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is directed to a centralized message delivery system which allows an incoming transaction (such as a telephone call or inquiry) to be associated with a particular transaction type, wherein a particular agent or transaction response system is chosen having the necessary qualifications to address the particular transaction type. Particular embodiments of the invention play a message or greeting, during connection to the agent, which corresponds to the particular transaction type. Further, the message or greeting played to the caller is in the voice of the particular agent who was chosen as having the necessary qualifications to address the particular call type or inquiry.

Figure 1:
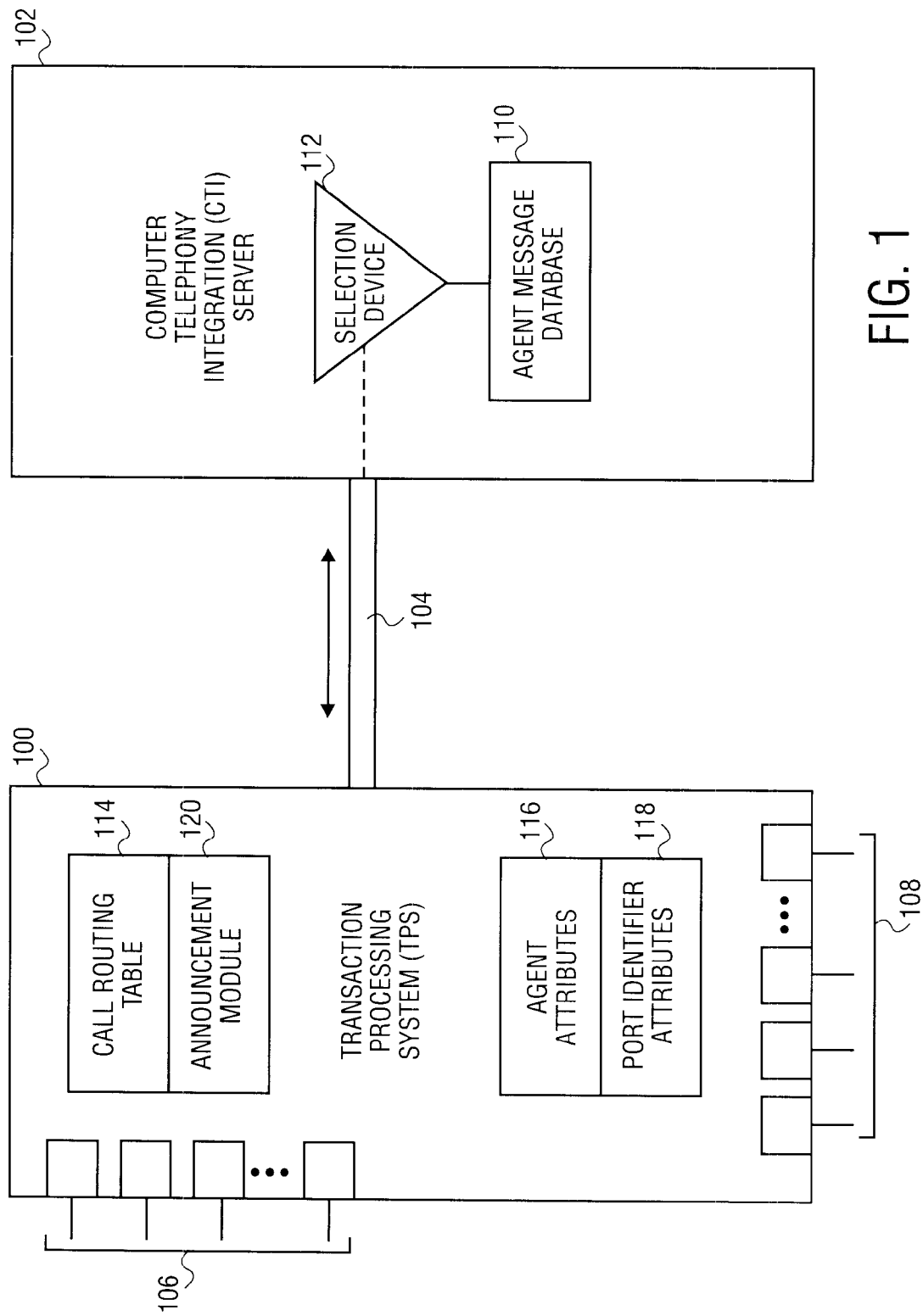
FIG. 1 illustrates an embodiment of a messaging device capable of implementing the teachings of the present invention.

FIG. 1 is a block diagram of an embodiment of a messaging device capable of implementing the teachings of the present invention. The embodiment of FIG. 1 provides an example of a system for processing telephone calls.

However, the teachings of the present invention can be used to process any type of transaction, such as voice mail messages and video conference or video phone sessions. FIG. 1 illustrates a transactional processing system (TPS) 100 coupled with an interface message device or computer telephony integration (CTI) server 102 through a communication link 104. The communication link 104 can be any medium or device which allows information or data to be exchanged between the TPS 100 and the CTI server 102. As shown, the TPS 100 contains a plurality of incoming call links 106 for supplying incoming calls to the TPS 100. Additionally, the TPS 100 contains a plurality of agent communication ports 108, wherein the agent communication ports 108 allow for communication between the service agents and the originators (callers) of the incoming calls.

The CTI server 102, which is coupled to the TPS 100, contains an agent message database 110 containing multiple messages which are associated with multiple different agents. Additionally, a message selection device 112, which is included with the CTI server 102, is configured to select an agent message from the agent message database 110 corresponding to a particular agent based upon a identifier. An identifier is any type of data which allows the call type or inquiry type to be classified as corresponding to a particular area or field (e.g., technical support or sales).

The agent message database 110, as indicated, is comprised of a collection of messages which are recorded by various agents, with a respective set of messages associated with each individual agent. Each message within the set of agent messages contained in the agent message database 110 corresponds to a particular identifier. In operation, the CTI server 102 selects an appropriate message from the selected agent's respective set of messages based upon the particular identifier corresponding to the inquiry. The selected appropriate message is then supplied to either the TPS 100 or directly to a corresponding incoming call link 106.

Moreover, the CTI server 102 may be maintained at a location which is external to the TPS 100, thereby allowing the agent messages within the agent message database 110 to be located within a centralized location. Further, the agent messages contained within the agent message database 110 may be altered or removed, at the centralized location, by personnel having the appropriate authorization to do so.

In an alternate embodiment, the agent message database 110 is comprised of a collection of message codes associated with various agents, with a respective set of messages codes associated with each individual agent. Each message code contained within the collection of message codes corresponds to a particular identifier. Accordingly, a selected message code, rather than an agent message, is supplied to an announcement module 120 located within the TPS. The announcement module 120 is comprised of a collection of messages which are recorded by various agents, with a respective set of messages associated with each individual agent. Each message within the set of agent messages contained in the announcement module 120 corresponds to a particular message code. In operation, the CTI server 102 selects an appropriate message code from the selected agent's respective set of messages codes contained in the agent message database 110 based upon the particular identifier corresponding to the inquiry. The selected appropriate message code is then supplied to announcement module 120 located within the TPS 100. Wherein, the announcement module 120 plays an agent message corresponding to the message code supplied by the agent message database 110.

Figure 2:
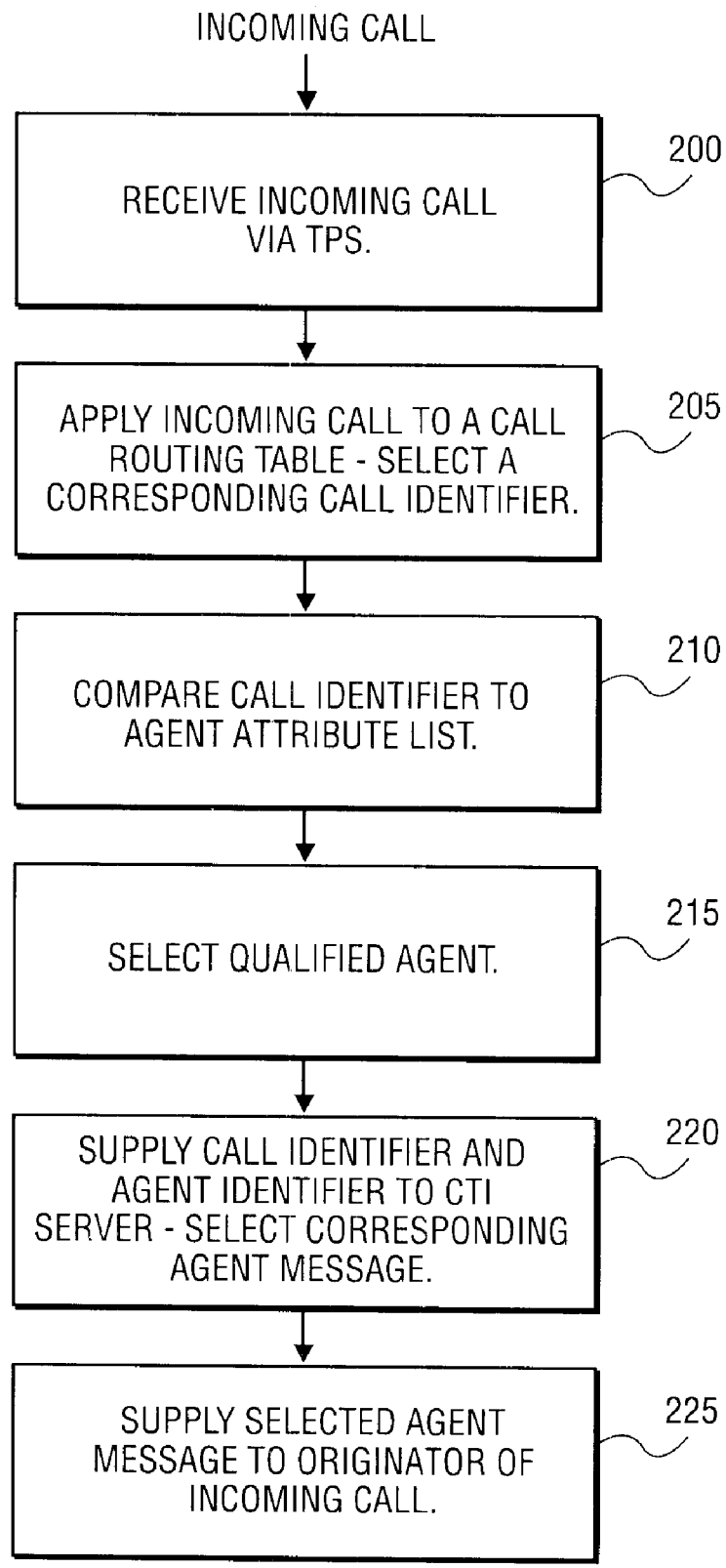
FIG. 2 illustrates an embodiment of the operation of the messaging device in flow diagram format.

FIG. 2 illustrates, in a flow diagram, an embodiment of the operation of the messaging device. Initially, at step 200, an incoming call or inquiry is received by the TPS 100. At step 205, the incoming call is applied to a call routing table 114 within the TPS 100, wherein a call identifier is selected which corresponds to the inquiry type of the incoming call. The call routing table 114 may be any type of logic or routing mechanism that assists with the routing of calls in the TPS 100. The inquiry type assigned to the incoming call may be determined by a variety of methods, such as, but not limited to, Automatic Number Identification (ANI), Dialed Number Information Service (DNIS), and Touch Tone Selection (TTS). For example, based on ANI information received, the identity of the caller may be determined from a customer database containing customer phone numbers. Based on the caller's identity, the system may predict the type of inquiry. The call routing table 114 may use a scripting language to select call identifiers for the incoming calls. Each of the aforementioned methods, as well as other methods, could be used singularly or in combination with one another, in order to provide for the assigning of an inquiry type to an incoming call. The call identifier, which is associated with the inquiry, may be any identifier which can classify the call according to the inquiry type of the call. For example, an incoming call may be an inquiry regarding technical software questions and a warranty question associated with the software, wherein the incoming call would be assigned a call identifier indicating the type of inquiry associated with the particular call (i.e., technical question and warranty question).

In particular situations, an incoming call may not contain any ANI, DNIS, or other identification information. In these situations, an agent may be selected using another procedure (e.g., at random).

Accordingly, at step 210, the call identifier is be compared to a listing of agent attributes 116 associated with a qualified agent group. Wherein, at step 215, an agent having individual attributes corresponding or correlating to the call identifier would be the agent which is selected as being qualified to handle the incoming call. Therefore, the agent who is qualified to handle the incoming call would be selected as the actual agent to service the incoming call, as such, the call identifier would now also include a agent identifier corresponding to the selected agent.

Next, at step 220, the call identifier containing the agent identifier is transmitted or supplied to the CTI server or interface message device 102 (e.g., via communication link 104), wherein an agent message associated with the selected agent is chosen from an agent message database 110 based upon the call identifier.

As mentioned above, the CTI server 102 is a centralized server which contains an agent message database 110 comprised of a collection of messages which are recorded by various agents, with a respective set of messages associated with each individual agent. Each message within the set of agent messages contained in the agent message database 110 corresponds to a variety of different call identifiers. Based on particular call identifiers, the agent could have a variety of messages which could be used to greet the incoming call corresponding to a particular call identifier. For instance, in the situation where a caller has both a technical question and a warranty question, the agent database may contain a greeting or message associated with a technical type question, a greeting or message associated with a warranty type question, and a combination greeting or message associated with both a technical type and warranty type question. Therefore, in response to an incoming call having a call identifier corresponding to both a technical question and a warranty question, the combination greeting or message associated with both a technical type and warranty type question would be played to the caller in the voice corresponding to the agent identifier. As illustrated by the above example, the messages in the agent message database 110 may be arranged in any configuration which would allow an appropriate agent message to be played in response to an incoming call. For instance, a customized message could be played to a caller whose telephone number is identified through an Automatic Number Identification (ANI) as corresponding to a particular VIP status caller (i.e.—"Hello Mr. Smith, thank you for calling, your call will be handled within the next thirty seconds").

Moreover, as mentioned above, the CTI server 102 is a centralized server which allows for the storage of agent messages at a central location, thereby reducing the need for associated individual routing equipment that would otherwise be necessary in a conventional system. Thus, an agent can be connected to any agent communication port 108 without requiring a separate set of messages associated with each port 108. Further, the CTI server 102 may be located at an area external to the TPS 100. A centralized CTI server 102 also allows for central control over the messages stored on the CTI server 102, wherein authorized supervisory personnel can review any of the messages contained with a respective set of messages associated with an agent. Therefore, if supervisory personnel determine that a particular agent's message on the agent message database 110 in inappropriate, the supervisors may remove or alter the inappropriate message from the agent message database 110 and request that the particular agent record another replacement message.

At step 225, once the appropriate agent message has been determined, the selected agent message data is supplied to the TPS 100 from the CTI 102 via communication link 104. The TPS 100 then plays the selected agent message to the originator (caller) of the incoming call located at the corresponding incoming call link 106. After the selected agent message is played to the caller, the agent associated with the selected agent message is connected directly with the caller. The present centralized message delivery system allows the routing of the caller to the agent to take place as soon as the agent is identified (i.e.—agent identifier assignment). Therefore the routing of the caller to the selected agent may take place during the playing of the selected message to the caller, resulting in minimal delay in connection time after the message is played to the caller.

Figure 3:
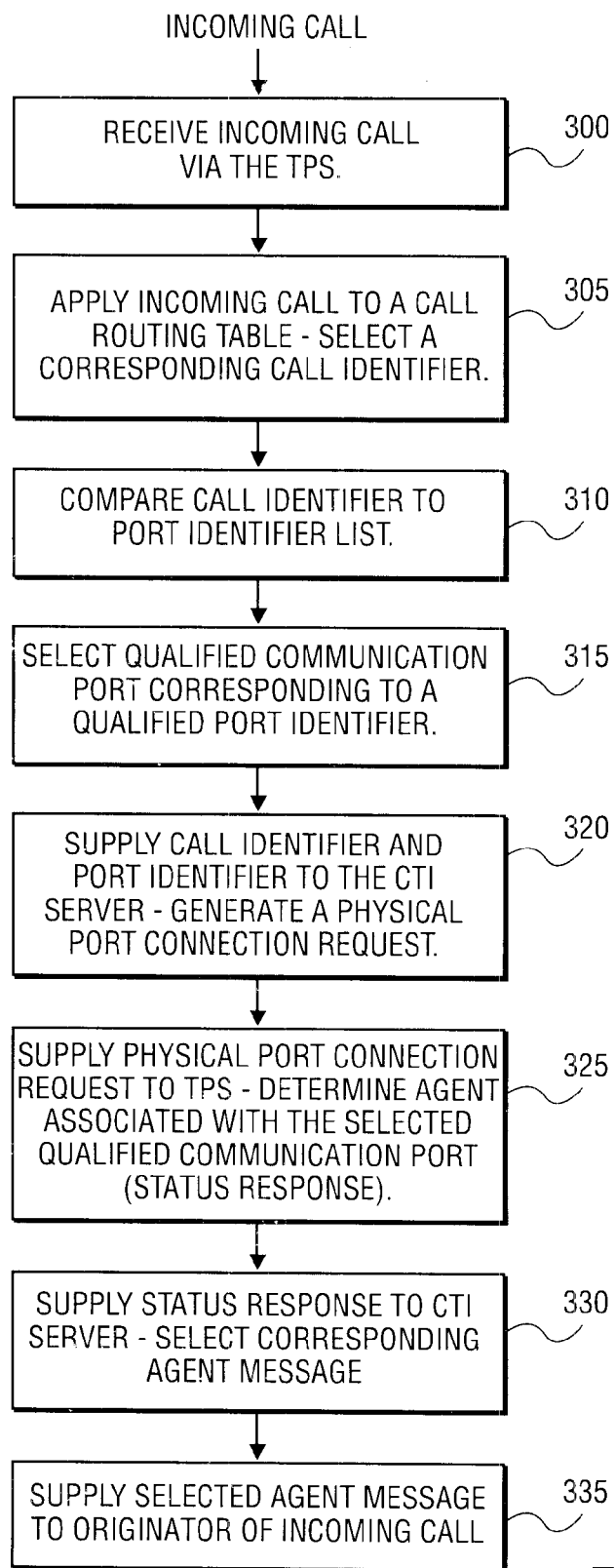
FIG. 3 illustrates an alternate embodiment of the operation of the messaging device in flow diagram format.

FIG. 3 illustrates, in a flow diagram, an alternate embodiment of the operation of the messaging device. Initially, at step 300, an incoming call is received by the TPS 100. At step 305, the incoming call is applied to a call routing table 114 within the TPS 100, wherein a call identifier is selected which corresponds to the inquiry type of the incoming call. The inquiry type assigned to the incoming call may be determined by a variety of methods, such as, but not limited to, Automatic Number Identification (ANI), Dialed Number Information Service (DNIS), and Touch Tone Selection (TTS). Each of the aforementioned methods, as well as other methods, could be used singularly or in combination with one another, in order to provide for the assigning of an inquiry type to an incoming call. Accordingly, the call identifier may be any identifier which can classify the call according to the inquiry type associated with the call. For example, an incoming call may be an inquiry regarding technical software questions and a warranty question associated with the software, therefore, the incoming call would be assigned a call identifier indicating the type of inquiry associated with the particular call (i.e.—technical question and warranty question).

At step 310, the call identifier is compared to a listing of port identifiers 118 within the TPS 100, with each port identifier having a set of individual attributes associated with the port identifier. At step 315, a port identifier having individual attributes corresponding to the call identifier is selected as being the communication port which is qualified to handle the incoming call. The port identifier corresponds to an actual physical communication port, contained within the agent communication ports 108, which has a qualified agent located at the communication port capable of satisfying the requirements of the call identifier. Therefore, whatever agent is assigned to the communication port corresponding to the selected port identifier would necessarily be the agent which is qualified to handle the incoming call at the physical communication port, and as such, would be selected as the actual agent to service the incoming call.

Next, at step 320, the call identifier and the port identifier are transmitted or supplied to the CTI server 102. Since the agents assigned to the various port identifiers are not known, the CTI server 102 generates a physical port connection request which is transmitted or supplied to the TPS 100 in order to determine which agent is located at the selected physical communication port.

At step 325, the TPS 100 determines the agent who is assigned to the actual physical communication port based on the port identifier contained in the physical port connection request. The TPS 100 maintains a listing of the agents who are logged in on each individual physical communication port, wherein a variety of different agents can be logged in at different physical communication ports at any time. Such a feature allows flexibility within the system as different agents may be selected and assigned to different physical communication ports, thereby allowing the system to be configured in a variety of ways to meet a desired operational protocol. After the TPS 100 has determined identity of the agent located at the requested physical communication port, the TPS 100 generates a status response including an agent identifier which identifies the agent assigned to the requested physical communication port corresponding to the port identifier. The status response is then supplied to the CTI server 102 server for further processing.

Next, at step 330, the CTI server 102 receives the status response, wherein an agent message associated with the determined agent (agent identifier) is chosen from an agent message database 110 based upon said call identifier. Accordingly, the CTI server selects the appropriate message from the selected agent's respective set of messages based upon the call identifier.

At step 335, after the appropriate agent message has been determined, the selected agent message data is supplied to the TPS 100 from the CTI server 102. The TPS 100 then plays the selected agent message to the originator (caller) of the incoming call. After the selected agent message is played to the caller, the agent associated with the selected agent message is connected directly with the caller. The present centralized message delivery system allows the routing of the caller to the agent to take place as soon as the agent is identified (i.e.—agent identifier assignment). Therefore the routing of the caller to the selected agent may take place during the playing of the selected message to the caller, resulting in minimal delay in connection time after the message is played to the caller.

Figure 4:
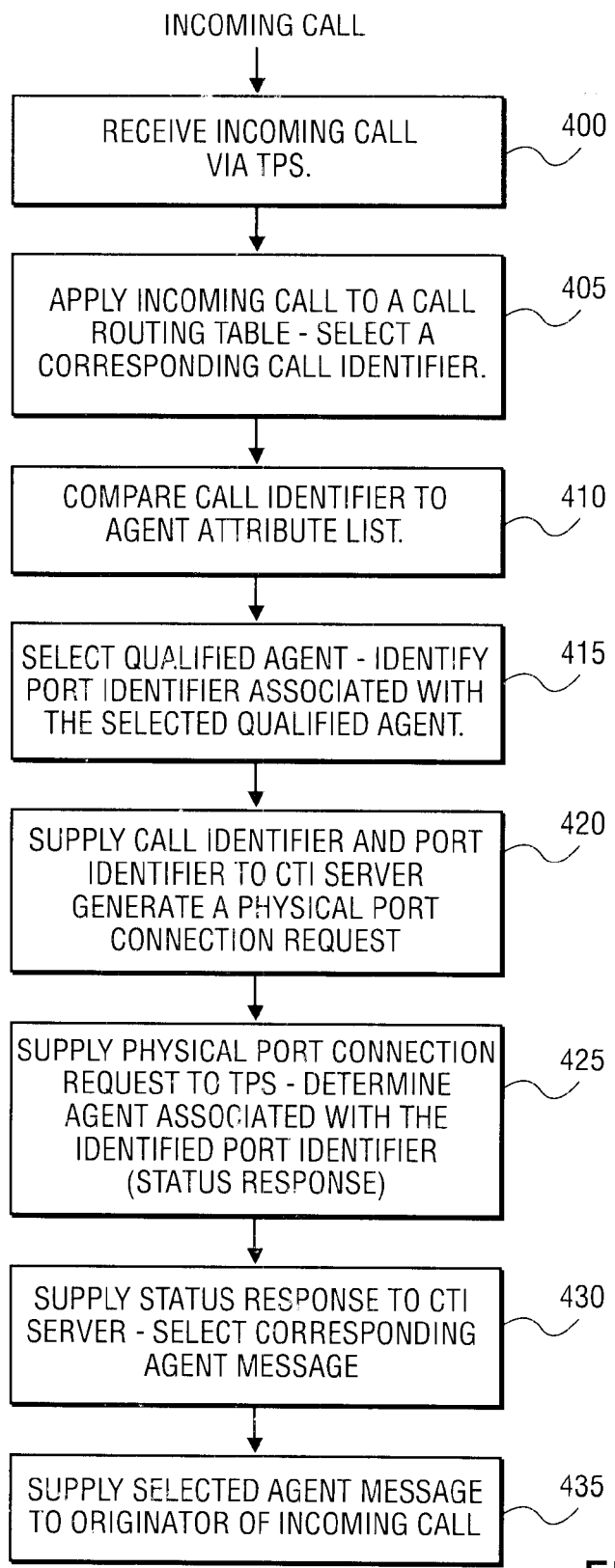
FIG. 4 illustrates another embodiment of the operation of the messaging device in flow diagram format.

FIG. 4 illustrates, in a flow diagram, another embodiment of the operation of the messaging device. Initially, at step 400, an incoming call is received by the TPS 100. At step 405, the incoming call is applied to a call routing table 114 within the TPS 100, wherein a call identifier is selected which corresponds to the inquiry type of the incoming call. The inquiry type assigned to the incoming call may be determined by a variety of methods, such as, but not limited to, Automatic Number Identification (ANI), Dialed Number Information Service (DNIS), and Touch Tone Selection (TTS). Each of the aforementioned methods, as well as other methods, could be used singularly or in combination with one another, in order to provide for the assigning of an inquiry type to an incoming call. Accordingly, the call identifier may be any identifier which can classify the call according to the inquiry type associated with the call. For example, an incoming call may be an inquiry regarding technical software questions and a warranty question associated with the software, therefore, the incoming call would be assigned a call identifier indicating the type of inquiry associated with the particular call (i.e.—technical question and warranty question).

Accordingly, at step 410, the call identifier is be compared to a listing of agent attributes 116 associated with a qualified agent group. Wherein, at step 415, an agent having individual attributes corresponding or correlating to the call identifier would be the agent which is selected as being qualified to handle the incoming call. Therefore, the agent who is qualified to handle the incoming call would be selected as the actual agent to service the incoming call. Additionally, a port identifier is identified as being associated with the selected qualified agent. The port identifier corresponds to an actual physical communication port, contained within the agent communication ports 108, which has the selected qualified agent located at the communication port capable of satisfying the requirements of the call identifier.

Next, at step 420, the call identifier and port identifier are supplied to the CTI server 102. The CTI server 102 generates a physical port connection request which is supplied to the TPS 100 in order to determine the identity of the selected qualified agent located at the selected physical communication port.

At step 425, the TPS 100 determines the identity of the agent who is assigned to the actual physical communication port based on the port identifier contained in the physical port connection request. The TPS 100 maintains a listing of the agents who are logged in on each individual physical communication port, wherein each agent can be identified as being logged in at different physical communication ports at any time. Such a feature allows flexibility within the system as different agents may be selected and assigned to different physical communication ports, thereby allowing the system to be configured in a variety of ways to meet a desired operational protocol. After the TPS 100 has determined the identity of the agent located at the requested physical communication port, the TPS 100 generates a status response including an agent identifier which identifies the agent assigned to the requested physical communication port corresponding to the port identifier. The status response is then supplied to the CTI server 102 server for further processing.

Next, at step 430, the CTI server 102 receives the status response, wherein an agent message associated with the determined agent identity (agent identifier) is chosen from an agent message database 110 based upon the call identifier and agent identifier. Accordingly, the CTI server selects the appropriate message from the determined agent's respective set of messages based upon the call identifier.

At step 435, after the appropriate agent message has been determined, the selected agent message data is supplied to the TPS 100 from the CTI server 102. The TPS 100 then plays the selected agent message to the originator (caller) of the incoming call. After the selected agent message is played to the caller, the agent associated with the selected agent message is connected directly with the caller. The present centralized message delivery system allows the routing of the caller to the agent to take place as soon as the agent is identified (i.e.—agent identifier assignment). Therefore the routing of the caller to the selected agent may take place during the playing of the selected message to the caller, resulting in minimal delay in connection time after the message is played to the caller.

With reference to the aforementioned embodiments relating to the operation of the messaging device, as explained in regard to FIG. 3 and FIG. 4, it is envisioned that the CTI server 102 could instead maintain an information database relating to the correlation between the agents and associated port identifiers. In this situation, the CTI server 102 would be able to determine the agent associated with a particular physical port without requiring the CTI server 102 to request such information from the TPS 100.

Although the teachings of the present invention are illustrated as embodied in the context of messaging devices, the present invention is not intended to be limited to such devices. Rather the teachings disclosed in the present invention could be applied to a variety of information devices and services, such as information kiosks, internet searching services, etc.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of generating a message in response to an inquiry, said method including:

applying said inquiry to a data table contained within a receiving device and associating a call identifier with said inquiry;

selecting an agent from an agent group corresponding to said call identifier;

supplying said call identifier to an interface message device, and selecting an agent message, associated with said selected agent, from an agent message database based upon said call identifier; and supplying said selected agent message to a source of said inquiry, wherein said agent message database contains a plurality of individual message sets associated with a plurality of individual agents, respectively, at a centralized location, each individual message set being recorded in a voice of an associated agent, and wherein said selected agent message is selected at said centralized location from an individual message set associated with said selected agent and wherein said call identifier is associated with said inquiry based upon a determined inquiry type.

2. The method of claim 1, wherein said selecting of said agent is based upon a correlation between said call identifier and at least one attribute associated with said agent.

3. The method of claim 1, wherein said interface message device is external to said receiving device.

4. The method of claim 1, wherein any message in said individual message sets can be altered at said central location.

5. The method of claim 1, wherein said agent message database is accessible only by select authorization.

6. The method of claim 1, wherein said selected agent is connected to said source of inquiry after said selecting of an agent from an agent group corresponding to said call identifier.

7. A method of generating a message in response to an inquiry, said method including:

applying said message to a data table contained within a receiving device, and associating a call identifier with said message;

selecting a communication port corresponding to said call identifier;

determining an agent associated with said communication port;

supplying said call identifier to an interface message device, and selecting an agent message, associated with said determined agent, from an agent message database based upon said call identifier; and, supplying said agent message to a source of said inquiry, wherein said agent message database contains a plurality of individual message sets associated with a plurality of individual agents, respectively, at a centralized location, each individual message set being recorded in a voice of an associated agent, and wherein said selected agent message is selected at said centralized location from an individual message set associated with said determined agent and wherein said call identifier is associated with said inquiry based upon a determined inquiry type.

8. The method of claim 7, wherein said selecting of said communication port is based upon a correlation between said call identifier and at least one attribute associated with said communication port.

9. The method of claim 7, wherein said interface message device is external to said receiving device.

10. The method of claim 7, wherein said agent message database is accessible only by select authorization.

11. The method of claim 7, wherein any message in said individual message sets can be altered at said central location.

12. The method of claim 7, wherein said determined agent connected to said source of inquiry after said determining of an agent associated with said communication port.

13. The method of claim 7, wherein different agents may be interchangeably associated with said communication ports.

14. A method of selecting a message in response to an inquiry, said method including:

receiving a call identifier associated with said inquiry, wherein said call identifier contains an agent identifier and indicates an inquiry type associated with said inquiry;

selecting an agent message associated with said agent identifier from an agent message database based upon said call identifier, wherein said agent message database contains a plurality of agent messages (1) associated with said agent identifier and (2) recorded in a voice of an agent associated with said agent identifier; and providing said selected agent message from said agent message database to a transaction processing system, wherein said agent message database contains a plurality of individual message sets associated with a plurality of individual agent identifiers at a centralized location.

15. The method of claim 14, wherein said selecting of said agent message is based upon a correlation between said call identifier and at least one attribute associated with said agent identifier.

16. The method of claim 14, wherein any message in said individual message sets can be altered at said centralized location.

17. The method of claim 14, wherein said agent message database is accessible only by select authorization.

18. A message selection apparatus comprising:

a message database to contain a plurality of messages associated with a plurality of agents, wherein each message is recorded in a voice of the associated agent; and a message selection device to select a message at said message database from said plurality of messages based upon an identifier, wherein said message associated with a selected agent is supplied to a transaction processing system, wherein said message database is maintained within a centralized location and said identifier indicates an inquiry type of an inquiry associated with said identifier.

19. The apparatus of claim 17, wherein any message is said message database can be altered at said central location.

20. The apparatus of claim 18, wherein said agent message database is accessible only by select authorization.

21. The apparatus of claim 18, wherein said message selection device selects a message based upon a correlation between said identifier and select attributes associated with an agent.

22. A message selection apparatus comprising:

a transactional processing system to receive an inquiry, wherein a call identifier and an agent identifier are associated with said inquiry; and an interface message device to receive said call identifier and said agent identifier, wherein an agent message associated with said agent identifier is selected from an agent message database based upon said call identifier, said agent message database being maintained at a centralized location and containing a plurality of messages (1) associated with said agent identifier and (2) recorded in a voice of an agent associated with said agent identifier, wherein said call identifier indicates an inquiry type associated with said inquiry and wherein said agent message database contains a plurality of individual message sets associated with a plurality of individual agent identifiers at the centralized location.

23. The apparatus of claim 22, wherein said agent identifier is associated with said inquiry based upon a correlation between said call identifier and select attributes associated with an agent.

24. The apparatus of claim 22, wherein said interface message device is external to said transactional processing system.

25. The apparatus of claim 22, wherein any message in said agent message database can be altered at said centralized location.

26. The apparatus of claim 22, wherein said agent message database is accessible only by select authorization.

* * * * *